No. 877,267. PATENTED JAN. 21, 1908.
R. DE VALBREUZE.
GEARING.
APPLICATION FILED MAY 31, 1907.
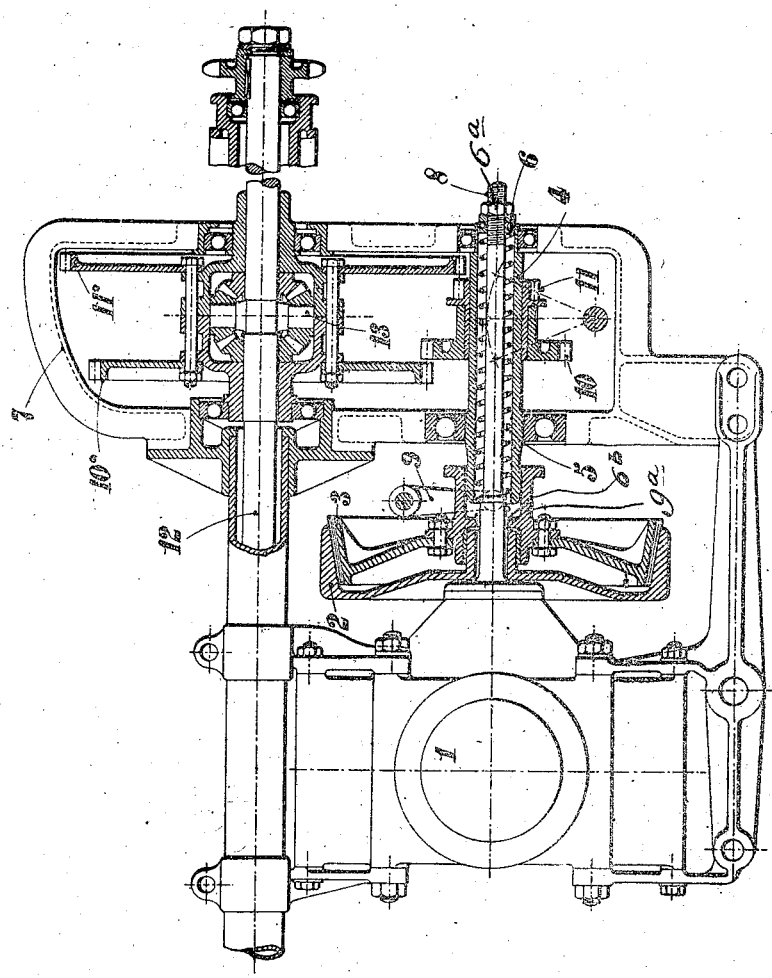
Witnesses:
Inventor
Robert de Valbreuze
By
James L. Norris

UNITED STATES PATENT OFFICE.

ROBERT DE VALBREUZE, OF LEVALLOIS-PERRET, FRANCE, ASSIGNOR TO SOCIÉTÉ DE CONSTRUCTIONS DE VÉHICULES AUTOMOBILES, OF LEVALLOIS-PERRET, FRANCE, A CORPORATION OF FRANCE.

GEARING.

No. 877,267.

Specification of Letters Patent.

Patented Jan. 21, 1908.

Application filed May 31, 1907. Serial No. 376,584.

*To all whom it may concern:*

Be it known that I, ROBERT DE VALBREUZE, citizen of the French Republic, residing at Levallois-Perret, Department of the Seine, in France, have invented certain new and useful Improvements in Gearing, of which the following is a specification.

This invention relates to a transmission gear for use in connection with motor vehicles and comprises in its construction a clutch mechanism, a change speed gear mechanism, and a differential gear mechanism interposed between the motor and the driving wheels; and has for its object to combine the said mechanism in a single group in such a manner as to occupy a minimum amount of space.

In describing the invention in detail reference is had to the accompanying drawing which illustrates in sectional elevation a transmission gear in accordance with this invention.

Referring to the drawings, 1 denotes a motor which drives the main shaft 8 in any suitable manner. Upon the shaft 8 is keyed a clutch member 2 in the form of a friction cone. The other clutch member which is also in the form of a friction cone is indicated by the reference character 3 and is mounted upon a square shaft 4. The main shaft 8 extends through a casing 7 and has the end which projects from said casing screw-threaded. Mounted upon the main shaft 8 is the square shaft 4, the latter serving as an intermediate shaft between the main shaft and a counter-shaft to be hereinafter referred to. The shaft 4 is hollow throughout its entire length and serves for the reception of a clutch spring 5 which is adjusted through the medium of a disk 6 arranged upon the screw-threaded end of the main shaft 8, adapted to be engaged by a nut 6ª. The disk 6 bears against one extremity of the spring 5, while the other extremity of said spring bears against a disk 6ᵇ formed integral with the friction cone 3. By such an arrangement the clutch spring is lodged entirely within the shaft 4, which permits of a large economy of space and enables the casing 7 to be arranged in close proximity to the clutch. Furthermore, as the means for adjusting the spring 5 is positioned exteriorly of the casing 7 it enables the convenient adjustment of the said spring when occasion so requires. The clutch members 2 and 3 are separated by any suitable means, for example, a lever 9 connected with the operating pedal of the vehicle and engaging the hub 9ª of the friction cone 3.

The casing 7 provides a means for housing the speed change gear mechanism and also the differential gear mechanism. The speed change gear, by way of example, is shown as consisting of a pair of pinions 10, 11 and a pair of gear wheels 10′ and 11′. The pinions 10, 11 are of different diameters with respect to each other and the gear wheels 10′ and 11′ are of different diameters with respect to each other. The pinions 10 and 11 form what may be termed a sliding train and are suitably connected together and arranged on the square shaft 4. The pinions 10 and 11 are controlled in a known manner by means of an ordinary fork and are caused to engage, respectively, with the gear wheels 10′ and 11′ which are connected with a sectional counter-shaft 12. The latter extends through the casing 7 and the sections thereof are connected together through the medium of a differential gear 13 of known construction, the gear being arranged within the casing 7. The two extremities of the counter-shaft 12 project from the casing 7 and carry toothed pinions by means of which the motive power is transmitted to the driving wheels of the vehicle in a known manner.

What I claim is—

1. A transmission gear for motor vehicles comprising a casing, a shaft extending therethrough, a square shaft surrounding the driving shaft, a clutch member rotating with the driving shaft, a slidable clutch member mounted upon said square shaft and adapted to frictionally engage the other clutch member, a spring interposed between the shafts and bearing against said slidable clutching member, a counter-shaft formed of two sections journaled in and extending through said casing, a differential gear mounted in the casing and connecting the sections of the counter-shaft together, a pair of gear wheels arranged within the casing and connected with the counter-shaft, and a plurality of slidable pinions carried by the square shaft and adapted to engage with said gear wheels.

2. A transmission gear for motor vehicles comprising a casing, a shaft extending therethrough, a square shaft surrounding the driving shaft, a clutch member rotating with the driving shaft, a slidable clutch member mounted upon said square shaft and adapted to frictionally engage the other clutch member, a spring interposed between the shafts and bearing against said slidable clutch member, a counter-shaft formed of two sections journaled in and extending through said casing, a differential gear mounted in the casing and connecting the sections of the counter-shaft together, a pair of gear wheels arranged within the casing and connected with the counter-shaft, a plurality of slidable pinions carried by the square shaft and adapted to engage with said gear wheels, and means arranged exteriorly of the casing and engaging the driving shaft for adjusting the tension of said spring.

3. A transmission gear for motor vehicles comprising a driving shaft, a transmission shaft surrounding the driving shaft, a casing through which extend the transmission and the driving shaft, a clutch arranged exteriorly of the casing and in close proximity thereto, said clutch constituting means for connecting the transmission shaft to the driving shaft, a sectional counter-shaft extending through the casing, a differential gearing for connecting the sections of the shaft together, and a speed change gear arranged within the casing and having certain of its elements carried by the counter-shaft and the other of its elements carried by the transmission shaft.

4. A transmission gear for motor vehicles comprising a driving shaft, a transmission shaft surrounding the driving shaft, a casing through which extend the transmission and the driving shaft, a clutch arranged exteriorly of the casing and in close proximity thereto, said clutch constituting means for connecting the transmission shaft to the driving shaft, a sectional counter-shaft extending through the casing, a differential gearing for connecting the sections of the counter-shaft together, a speed change gear arranged within the casing and having certain of its elements carried by the counter-shaft and the other of its elements carried by the transmission shaft, a clutch spring interposed between the transmission and driving shafts, said spring bearing against one of the elements of the clutch, and means upon the driving shaft for adjusting the tension of said spring, said means arranged exteriorly of the casing.

In testimony whereof I have hereunto set my hand in presence of two subscribing witnesses.

ROBERT DE VALBREUZE.

Witnesses:
EMILE KLOTZ,
WARD RIVAUD.